(12) United States Patent
Kosaki et al.

(10) Patent No.: US 9,077,019 B2
(45) Date of Patent: Jul. 7, 2015

(54) ELECTRICITY STORAGE DEVICE AND VEHICLE

(75) Inventors: Akihiro Kosaki, Aichi-ken (JP); Shigeru Fukuda, Nagoya (JP); Shigeto Ozaki, Obu (JP); Kaoru Tsuge, Okazaki (JP); Kenji Iida, Nagoya (JP); Takenori Kobayashi, Toyota (JP); Motonari Tejima, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 361 days.

(21) Appl. No.: 13/819,003

(22) PCT Filed: Aug. 30, 2011

(86) PCT No.: PCT/IB2011/001988
§ 371 (c)(1),
(2), (4) Date: Apr. 16, 2013

(87) PCT Pub. No.: WO2012/028929
PCT Pub. Date: Mar. 8, 2012

(65) Prior Publication Data
US 2013/0202936 A1   Aug. 8, 2013

(30) Foreign Application Priority Data
Aug. 31, 2010   (JP) .................................. 2010-194531

(51) Int. Cl.
*H01M 2/10* (2006.01)
*H01G 9/00* (2006.01)
*H01G 11/18* (2013.01)
(Continued)

(52) U.S. Cl.
CPC ............... *H01M 2/1077* (2013.01); *B60K 1/04* (2013.01); *B60K 2001/0438* (2013.01); *H01G 9/155* (2013.01); *H01G 11/18* (2013.01); *H01M 2/1083* (2013.01); *H01M 10/0525* (2013.01); *H01M 10/345* (2013.01); *Y02T 10/7011* (2013.01); *Y02T 10/7022* (2013.01); *Y02E 60/13* (2013.01); *H01M 10/625* (2015.04); *H01M 10/6563* (2015.04); *H01M 10/647* (2015.04);
(Continued)

(58) Field of Classification Search
None
See application file for complete search history.

(56) References Cited

U.S. PATENT DOCUMENTS 5,378,555 A *   1/1995   Waters et al. ................... 429/97
5,639,571 A     6/1997   Waters et al.
(Continued)

FOREIGN PATENT DOCUMENTS

EP   0 663 701 A1   7/1995
JP   2005-019231 A   1/2005
(Continued)

OTHER PUBLICATIONS

Partial translation of Japanese Office Action for corresponding JP Patent Application No. 2010-194531 issued on Jul. 30, 2012.

*Primary Examiner* — Carlos Barcena
*Assistant Examiner* — Wojciech Haske
(74) *Attorney, Agent, or Firm* — Sughrue Mion, PLLC

(57) ABSTRACT

An electricity storage device includes a first battery stack (15), a second battery stack (11 to 14), and a case (22) that accommodates the first battery stack and the second battery stack. Each of the first battery stack and the second battery stack includes a plurality of cells (151) that are aligned and the second battery stack is placed under the first battery stack. The supporting member (80) that supports the first battery stack is placed between the first battery stack and the second battery stack and is fixed to the case.

7 Claims, 13 Drawing Sheets

(51) Int. Cl.
*H01M 10/625* (2014.01)
*H01M 10/6563* (2014.01)
*H01M 10/647* (2014.01)
*H01M 10/6554* (2014.01)
*H01M 10/613* (2014.01)
*B60K 1/04* (2006.01)
*H01M 10/0525* (2010.01)
*H01M 10/34* (2006.01)

(52) U.S. Cl.
CPC ........ *H01M 10/6554* (2015.04); *H01M 10/613* (2015.04)

(56) References Cited

U.S. PATENT DOCUMENTS

| | | |
|---|---|---|
| 2002/0102454 A1 | 8/2002 | Zhou et al. |
| 2008/0053716 A1 | 3/2008 | Scheucher |
| 2009/0197166 A1 | 8/2009 | Horii et al. |
| 2010/0112424 A1 | 5/2010 | Hayashi |

FOREIGN PATENT DOCUMENTS

| | | |
|---|---|---|
| JP | 2006-040644 A | 2/2006 |
| JP | 2007-257901 A | 10/2007 |
| JP | 2009-181896 A | 8/2009 |

* cited by examiner

ELECTRICITY STORAGE DEVICE AND VEHICLE

BACKGROUND OF THE INVENTION

1. Field of the Invention

The invention relates to an electricity storage device including a plurality of battery stacks, each including a plurality of cells, and to a vehicle including the same.

2. Description of Related Art

A plurality of battery stacks are mounted on a vehicle or the like in some cases. The battery stack is formed by aligning a plurality of unit cells in one direction and outputs energy that is used to drive the vehicle. Moreover, a plurality of battery stacks are aligned in a case (see Japanese Patent Application Publication No. 2009-181896 (JP-A-2009-181896), for example).

When the plurality of battery stacks are aligned, there is a case where heat remains between two adjacent battery stacks. The remaining heat can adversely affect the input/output characteristics of the unit cells.

SUMMARY OF THE INVENTION

An electricity storage device according to an aspect of the invention includes a first battery stack, a second battery stack, and a case that accommodates the first battery stack and the second battery stack. Each of the first battery stack and the second battery stack includes a plurality of cells that are aligned, and the second battery stack is placed under the first battery stack. A supporting member that supports the first battery stack is placed between the first battery stack and the second battery stack and is fixed to the case.

The case may include an inner wall formed of electrically insulating material and a reinforcement frame formed of metal. The supporting member may be formed of metal, may penetrate the inner wall, and may be in contact with the reinforcement frame. A resin may be used as the electrically insulating material, for example. When the inner wall of the case is formed of a resin, the heat in the case is difficult to escape from the case. Thus, the supporting member formed of metal penetrates the inner wall of the case and is in contact with the metallic reinforcement frame, so that it is possible to cause the heat in the case to be transferred from the supporting member to the reinforcement member, whereby the heat is dissipated to the outside of the case.

When a wire harness including a shielded wire is used, the shielded wire may be connected to the supporting member at a portion different from a portion, at which the supporting member is in contact with the reinforcement frame. With this configuration, the shielded wire is grounded via the metallic supporting member and the metallic reinforcement member. In addition, by utilizing the supporting member and the reinforcement member, it is possible to make the shielded wire short. The wire harness may be used as the cable for charging and discharging the first battery stack and the second battery stack.

A plurality of the second battery stacks may be aligned along the first battery stack. The reinforcement frame may be positioned between two of the second battery stacks that are adjacent to each other. With this configuration, the portion, at which the reinforcement frame and the supporting member are in contact with each other, is positioned between two of the second battery stacks that are adjacent to each other. There is a tendency that heat remains in the space created between two adjacent second battery stacks and therefore, when the portion, at which the reinforcement frame and the supporting member are in contact with each other, is positioned in this space, it is made possible to efficiently transfer the heat to the reinforcement frame.

The first battery stack and the second battery stack may be arranged so as to be perpendicular to each other when viewed from above the first battery stack and the second battery stack.

The electricity storage device according to the aspect of the invention may be mounted on a vehicle. When the electric power from the electricity storage device is supplied to a motor/generator, the kinetic energy for driving the vehicle is generated. In addition, the motor/generator can convert the kinetic energy generated during regenerative braking of the vehicle into electric energy and the electricity storage device can store this electric energy.

In the invention, the supporting member that supports the first battery stack is placed between the first battery stack and the second battery stack and is fixed to the case. If the heat remains in the space created between the first battery stack and the second battery stack, the heat is transferred to the case via the supporting member. Thus, it is possible to prevent heat from remaining between the first battery stack and the second battery stack and therefore, it is possible to suppress the increase in temperature of the first battery stack and the second battery stack.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
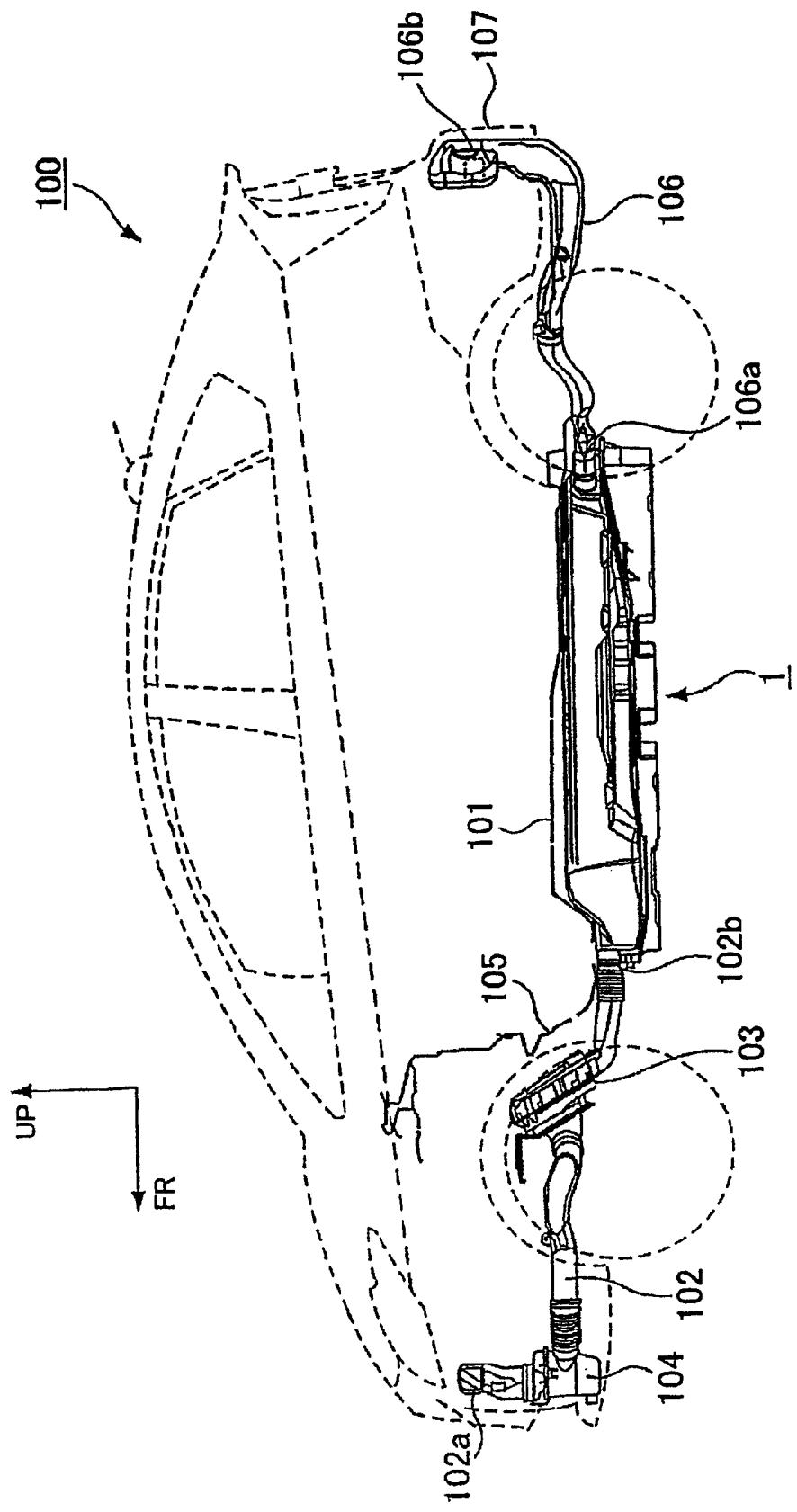
FIG. 1 is a side view of a vehicle equipped with a battery unit.

An embodiment of the invention will be described below. A battery unit, serving as an electricity storage device, that is an embodiment of the invention will be described. A vehicle equipped with the battery unit of this embodiment will be described with reference to FIG. 1. FIG. 1 is a side view of the vehicle, mainly showing the battery unit and a mechanism for regulating the temperature of the battery unit.

In FIG. 1, the arrow UP means the upward direction with respect to the vehicle and the arrow FR means the forward direction with respect to the vehicle.

The vehicle 100 of this embodiment includes a floor panel 101, on the underside of which the battery unit 1 is installed. The upper side of the floor panel 101 forms part of the cabin and therefore, the battery unit 1 is positioned outside the cabin. The cabin is a space for an occupant or occupants. The floor panel 101 is part of the body of the vehicle 100.

Examples of the vehicle 100, on which the battery unit 1 is mounted, include hybrid vehicles and pure electric vehicles. The hybrid vehicle is a vehicle equipped with an internal combustion engine or a fuel cell in addition to the battery unit 1 as the motive power source for driving the vehicle 100. The pure electric vehicle is a vehicle equipped with the battery unit 1 alone as the motive power source of the vehicle 100.

The battery unit 1 is connected to a motor/generator (not shown), which receives the output from the battery unit 1 to generate the kinetic energy for driving the vehicle 100. The torque output from the motor/generator is transmitted to wheels via a power transmission mechanism.

A step-up circuit and an inverter may be placed between the battery unit 1 and the motor/generator. When the step-up circuit is placed, it is possible to step up, or boost, the output voltage of the battery unit 1. When the inverter is used, it is possible to convert the direct-current (DC) power output from the battery unit 1 to the alternating-current (AC) power, so that it is possible to use a three phase AC motor as the motor/generator. The motor/generator converts the kinetic energy produced during braking of the vehicle 100 into electric energy and outputs the electric energy to the battery unit 1. The battery unit 1 stores the electric power supplied from the motor/generator.

An intake duct 102 is connected to the battery unit 1 and is disposed in front of the battery unit 1 in the vehicle 100. An intake port 102a is provided at one end of the intake duct 102 and air is taken in through the intake port 102a. The other end 102b of the intake duct 102 is connected to the battery unit 1.

A blower 103 is provided for the intake duct 102 and air is moved from the intake port 102a of the intake duct 102 toward the battery unit 1 by driving the blower 103. Although the blower 103 is provided for the intake duct 102 in this embodiment, the invention is not limited to this. It suffices that air flows from the intake port 102a of the intake duct 102 toward the battery unit 1. For example, the blower 103 may be provided for an exhaust duct 106 to be described later.

An air cleaner 104 is provided for the intake duct 102 and cleans the air taken in through the intake port 102a of the intake duct 102. Specifically, the air cleaner 104 removes the foreign matter contained in the air with the use of a filter. The blower 103 and the air cleaner 104 are disposed in the space provided in front of a dashboard 105 in the vehicle 100. This space corresponds to the engine compartment when the vehicle 100 is an automobile equipped with an engine.

The air introduced from the intake duct 102 into the battery unit 1 passes through the inside of the battery unit 1 and enters the exhaust duct 106. The air passes through the inside of the battery unit 1, so that it is possible to regulate the temperature of the battery unit 1. For example, air takes heat away from the battery unit 1, so that the battery unit 1 is cooled. The flow of air in the battery unit 1 will be described later.

One end 106a of the exhaust duct 106 is connected to the battery unit 1. An exhaust port 106b is formed at the other end of the exhaust duct 106. The other end of the exhaust duct 106 is positioned inside a rear bumper case 107. The air discharged through the exhaust port 106b moves into a space created in the rear bumper case 107.

Figure 2:
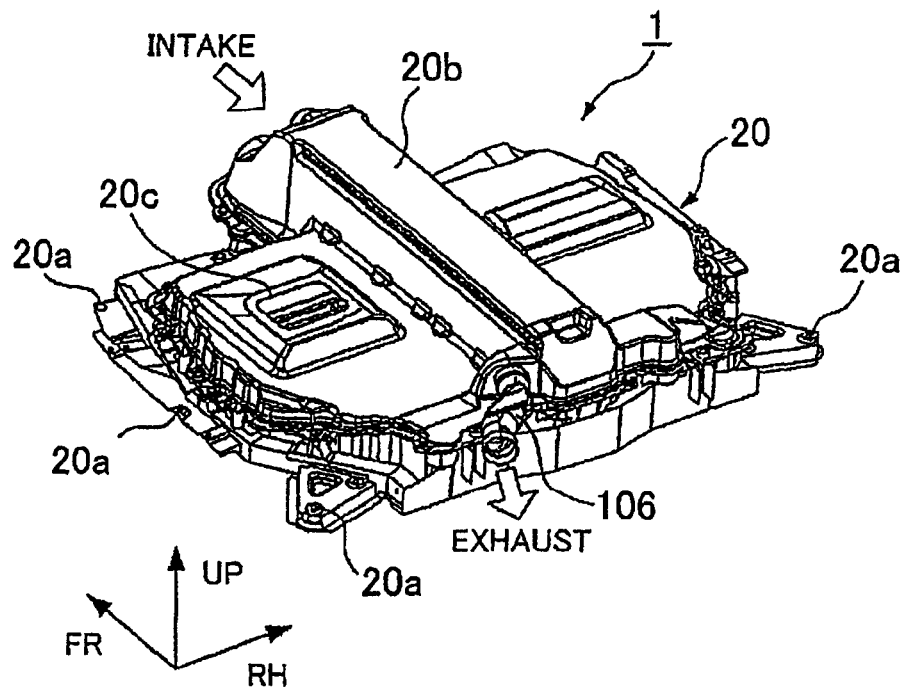
FIG. 2 is an external view of the battery unit.
Figure 3:
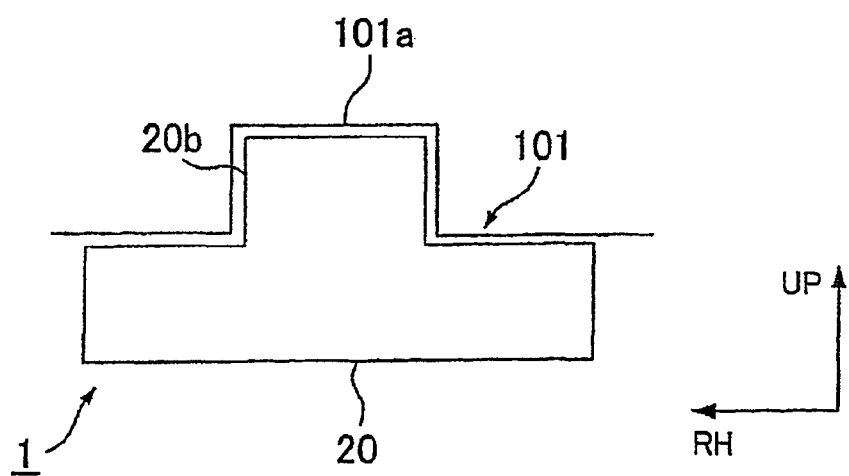
FIG. 3 is a schematic view of the battery unit and a floor panel when viewed from the front of the vehicle.
Figure 4:
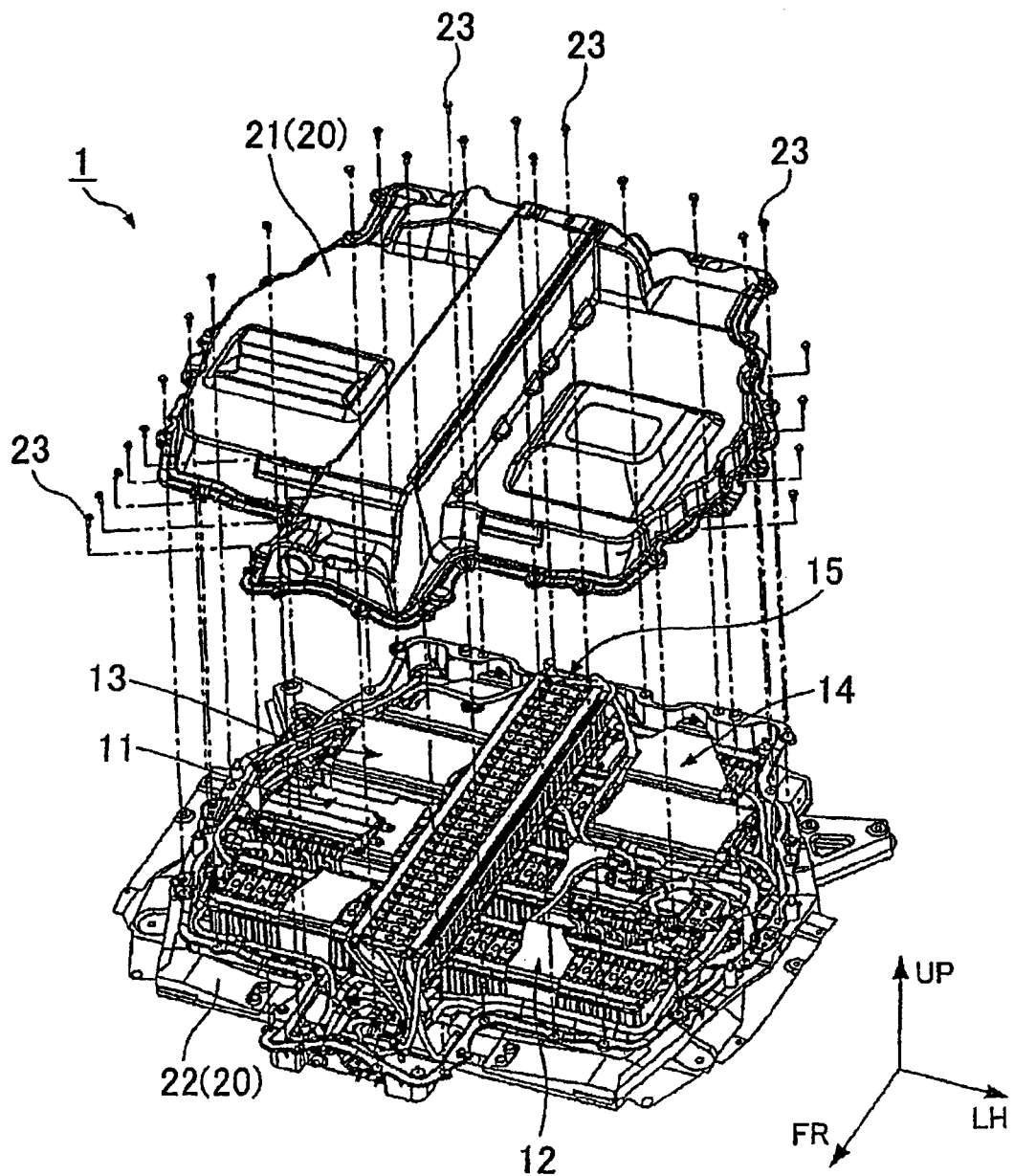
FIG. 4 is an exploded view of the battery unit.

Next, a configuration of the battery unit 1 will be described. FIG. 2 is an external view of the battery unit 1. FIG. 3 is a schematic view of the battery unit 1 and the floor panel 101 when viewed from the front of the vehicle 100. FIG. 4 is an exploded view of the battery unit 1. In FIG. 2, the arrow RH means the right when one faces the forward direction FR of the vehicle 100. In FIG. 4, the arrow LH means the left when one faces the forward direction of the vehicle 100.

The battery unit 1 includes five battery stacks 11 to 15, each of which serves as a battery stack, and a pack case 20 that accommodates the battery stacks 11 to 15. A plurality of fastening portions 20a are provided at the periphery of the pack case 20 and are used to fix the battery unit 1 to the floor panel 101.

A protruding portion 20b is formed on the upper side of the pack case 20. The protruding portion 20b protrudes upward and extends in the longitudinal direction of the vehicle 100. As shown in FIG. 3, the upper side of the pack case 20 is placed along the floor panel 101. The floor panel 101 has a center tunnel 101a.

The center tunnel 101a protrudes upward and extends in the longitudinal direction of the vehicle 100. The center tunnel 101a is provided between the driver's seat and the passenger seat in the lateral direction of the vehicle 100. The protruding portion 20b of the pack case 20 is positioned in the center tunnel 101a. An opening 20c, which is provided to pass a circuit breaker to be described later therethrough, is formed in the upper side of the pack case 20.

As shown in FIG. 4, the battery unit 1 has five battery stacks 11 to 15, which are covered by an upper case 21 and a lower case 22. The upper case 21 is fixed to the lower case 22 via a plurality of bolts 23. The upper case 21 may be formed of a resin containing glass fibers, for example.

The battery stacks 11 to 14 extend in the lateral direction of the vehicle 100 and the four battery stacks 11 to 14 are aligned in the longitudinal direction of the vehicle 100. The battery stack 15, which serves as a first battery stack, is positioned above the four battery stacks 11 to 14, each of which serves as a second battery stack, and the battery stack 15 extends in the longitudinal direction of the vehicle 100. The battery stack 15 is placed at a position corresponding to the protruding portion 20b of the pack case 20. Specifically, the battery stack 15 is positioned in the center tunnel 101a.

Figure 5:
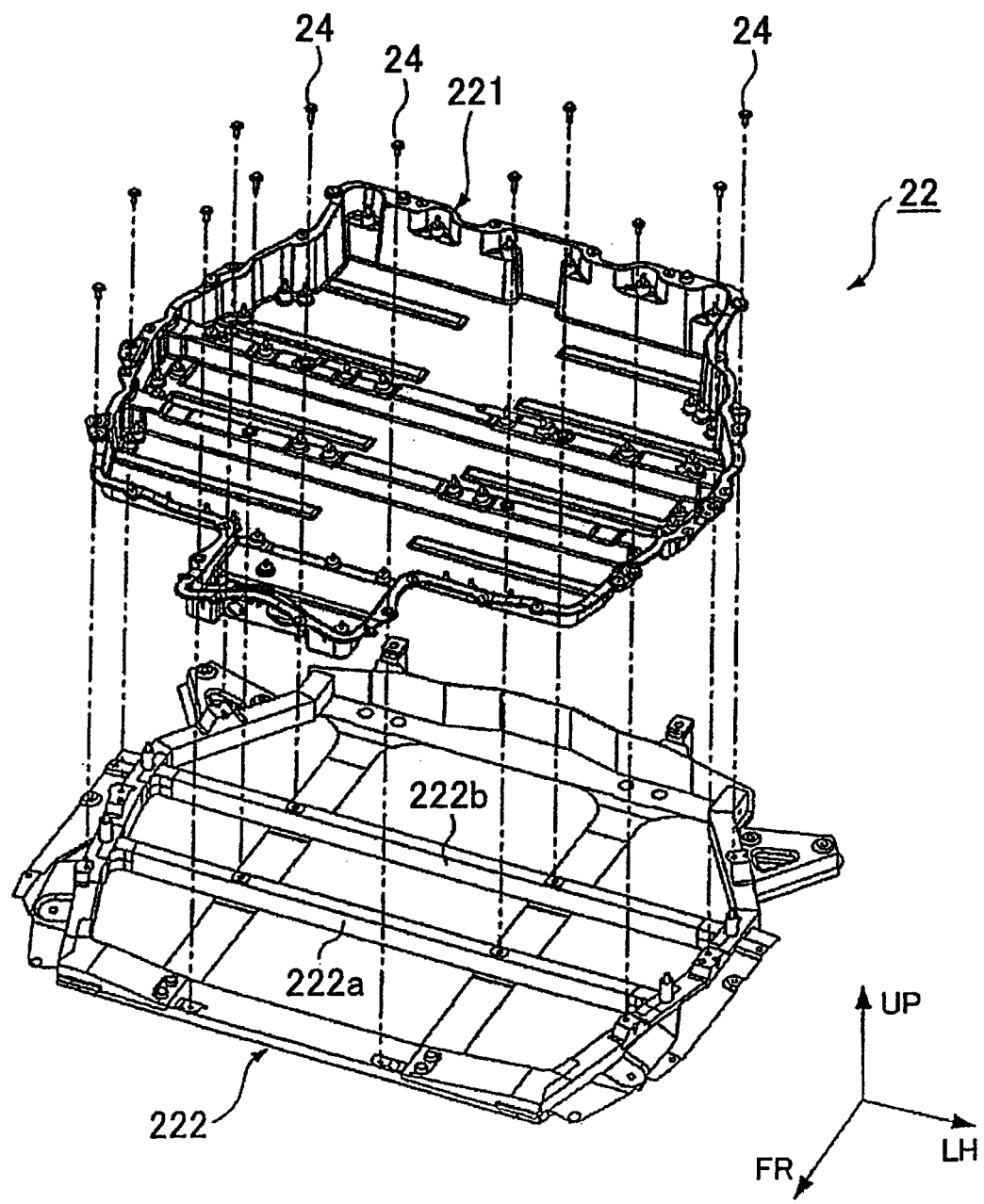
FIG. 5 is an exploded view of a lower case.

The lower case 22 has a lower carrier 221 and a frame 222, which serves as a reinforcement frame, as shown in FIG. 5. The battery stacks 11 to 15 are fixed to the lower carrier 221. The lower carrier 221 is fixed to the frame 222 via a plurality of bolts 24. The lower carrier 221 may be formed of a resin containing glass fibers, for example. The frame 222 is exposed to the outside of the lower case 22 and may be made of a metal, such as iron. The frame 222 is used to secure the strength of the lower case 22 and has reinforcements 222a and 222b that extend in the lateral direction of the vehicle 100. The frame 222 is fixed to the floor panel 101.

Figure 6:
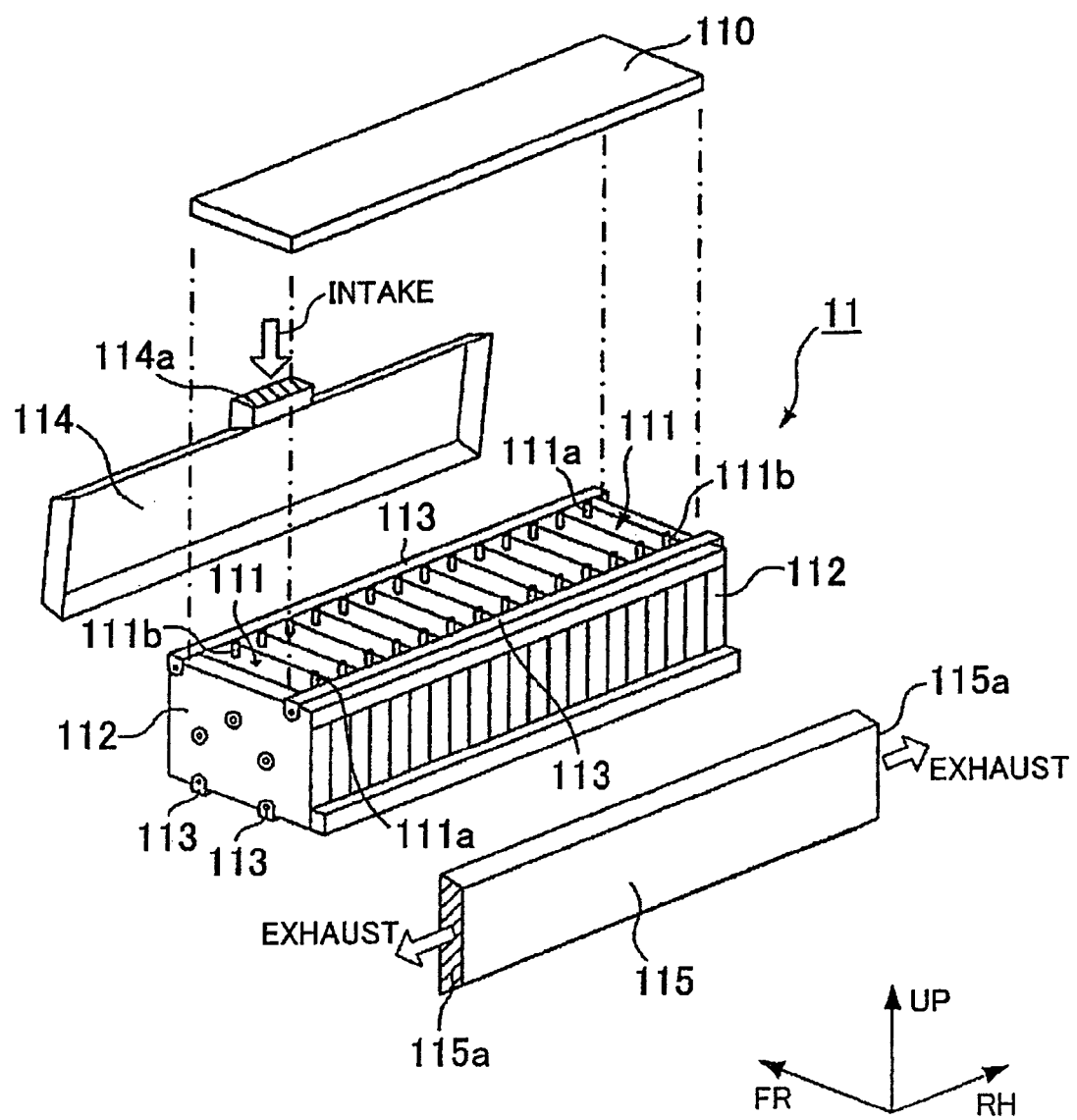
FIG. 6 is an exploded view of a battery stack.

Next, the configuration of each of the battery stacks 11 to 15 will be described. FIG. 6 is an exploded view of the battery stack 11. The battery stack 11 has a plurality of unit cells 111, each of which serves as a cell, that are aligned in one direction. A rectangular unit cell is used as the unit cell 111. In this embodiment, the number of unit cells constituting each of the battery stacks 11 to 15 differs from each other.

The number of unit cells constituting each of the battery stacks 11 to 15 may be suitably set. In this embodiment, the number of unit cells constituting each of the battery stacks 11 to 15 is set according to the shape of the lower case 22. In addition, a separator plate is placed between two adjacent unit cells 111. The separator plate is formed of an electrically insulating material, such as a resin, and is used to create a space on each of the surfaces of the unit cells 111.

A secondary battery, such as a nickel-hydrogen battery or a lithium-ion battery, may be used as the unit cell 111. Instead of the secondary battery, an electric double layer capacitor (capacitor) may be used. While a plurality of unit cells are aligned in one direction in each of the battery stacks 11 to 15 of this embodiment, the invention is not limited to this. Specifically, a configuration may be employed, in which a plurality of unit cells are used to form a battery module and a plurality of the battery modules are aligned in one direction.

An electricity generating element is housed in the unit cell 111. The electricity generating element is an element that can perform charging and discharging. The electricity generating element may include a cathode element, an anode element, and a separator including the electrolytic solution placed between the cathode element and the anode element, for example. The cathode element is obtained by forming a cathode active material layer on the surface of a current collector. The anode element is obtained by forming an anode active material on the surface of a current collector.

A cathode terminal 111a and an anode terminal 111b are provided on the upper side of the unit cell 111. The cathode terminal 111a is electrically connected to the cathode element of the electricity generating element. The anode terminal 111b is electrically connected to the anode element of the electricity generating element. Two adjacent unit cells 111 are electrically connected to each other via a bus bar.

In this embodiment, a bus bar module 110, into which a plurality of bus bars are integrated, is used. The bus bar module 110 is placed on the upper side of the battery stack 11. The bus bar module 110 has a plurality of bus bars and a holder that holds the bus bars. The holder is formed of an electrically insulating material, such as a resin. Each bus bar may be covered by an electrically insulating cover, such as a resin cover, and the cover may be attached to the holder.

A pair of end plates 112 are placed at two ends of the battery stack 11. A restraining band 113 extends in the direction of alignment of the plurality of unit cells 111 and two end portions of the restraining band 113 are fixed to the pair of end plates 112. Two of the restraining bands 113 are placed on the upper side of the battery stack 11 and two of the restraining bands 113 are placed on the lower side of the battery stack 11.

When the restraining band 113 is fixed to the end plates 112, the pair of end plates 112 are displaced in the directions such that the pair of end plates 112 are brought closer to each other. In this way, a restraining force is exerted on the plurality of unit cells 111 that are sandwiched between the pair of end plates 112. A spacer is placed between the two adjacent unit cells 111 and air can enter between two adjacent unit cells 111.

An intake chamber 114 and an exhaust chamber 115 are disposed at two sides of the battery stack 11. Specifically, the intake chamber 114 and the exhaust chamber 115 are disposed at positions such that the intake chamber 114 and the exhaust chamber 115 sandwich the plurality of unit cells 111 in the direction perpendicular to the direction of alignment of the plurality of unit cells 111. The intake chamber 114 has a connection port 114a, through which air from the intake duct 102 enters. The air that moves into the intake chamber 114 enters the space created between two adjacent unit cells 111. Air moves from the intake chamber 114 toward the exhaust chamber 115.

Heat is exchanged between air and the unit cells 111, so that it is possible to regulate the temperature of the unit cells 111. When the unit cells 111 are charged or discharging and are therefore generating heat, air takes heat away from the unit cells 111, so that it is possible to suppress the increase in temperature of the unit cells 111. The air that has passed through the space between two unit cells 111 moves into the exhaust chamber 115. Exhaust ports 115a are provided at two ends of the exhaust chamber 115 and air after heat exchange is discharged through the exhaust ports 115a. The air discharged through the exhaust ports 115a moves into the space created between the upper case 21 and the lower case 22.

The configuration of the battery stacks 12 to 15 is basically similar to that of the battery stack 11. The number of unit cells constituting each of the battery stacks 11 to 15 differs from each other. The plurality of unit cells constituting each of the battery stacks 11 to 14 are aligned in the lateral direction of the vehicle 100 and the plurality of unit cells constituting the battery stack 15 are aligned in the longitudinal direction of the vehicle 100.

Figure 7:
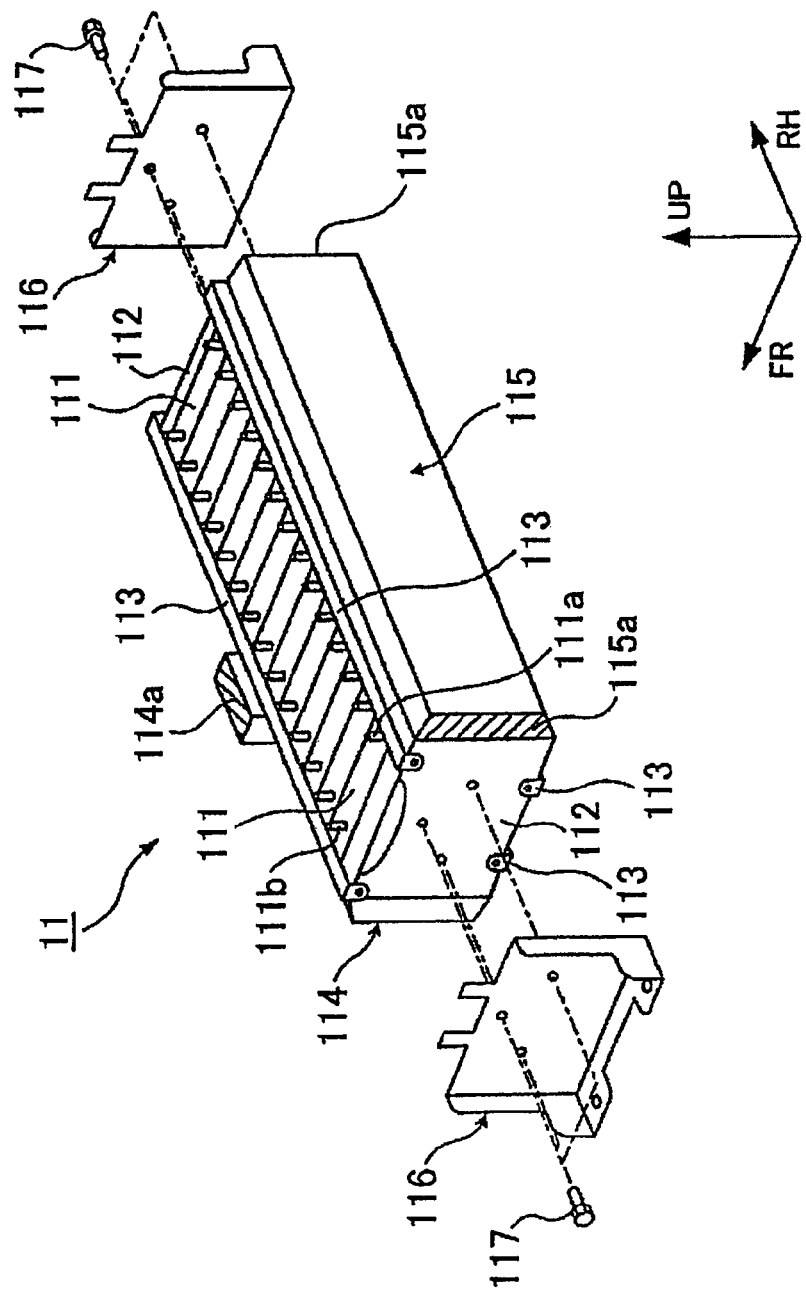
FIG. 7 is an external view of a fixation structure of the battery stack.
Figure 8:
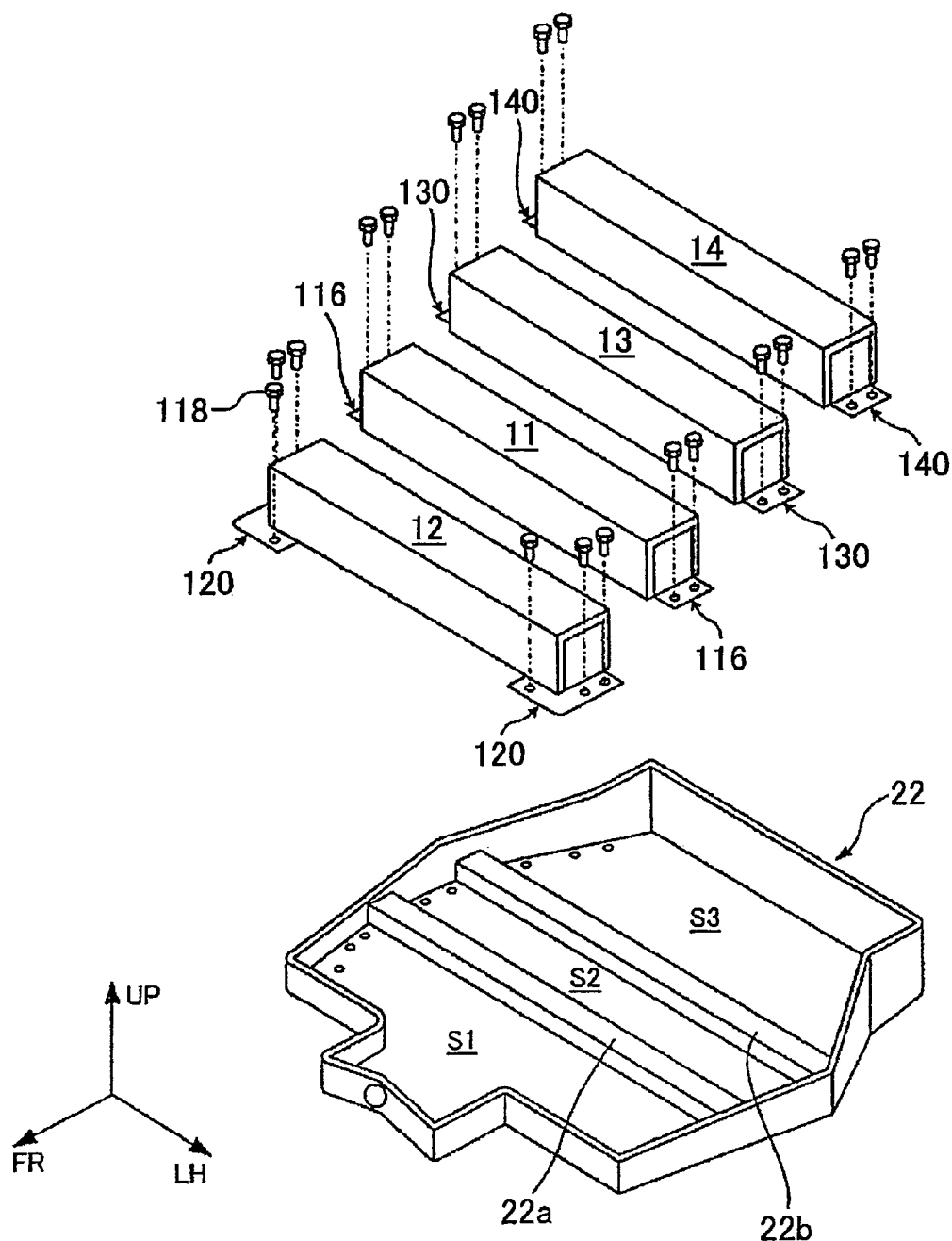
FIG. 8 is an external view of an internal structure of the battery unit.

As shown in FIG. 7, a bracket 116 is fixed to the end plates 112 of the battery stack 11 via bolts 117. As shown in FIG. 8, the bracket 116 is fixed to the lower case 22 via bolts 118. In this way, the battery stack 11 is fixed to the lower case 22.

A bracket 120 is used to fix the battery stack 12 to the lower case 22. Specifically, the bracket 120 is fixed to the pair of end plates of the battery stack 12 and to the lower case 22. A bracket 130 is used to fix the battery stack 13 to the lower case 22.

Specifically, the bracket 130 is fixed to the pair of end plates of the battery stack 13 and to the lower case 22. A bracket 140 is used to fix the battery stack 14 to the lower case 22. Specifically, the bracket 140 is fixed to the pair of end plates of the battery stack 14 and to the lower case 22. The battery stacks 11 to 14 axe fixed to the lower case 22 via not only the brackets 116, 120, 130, and 140 but also the brackets 30 (see FIG. 10).

The lower case 22 has two ribs 22a and 22b. The ribs 22a and 22b protrude upward and extend in the lateral direction of the vehicle 100. Part of the frame 222 shown in FIG. 5 (reinforcements 222a and 222b) forms the ribs 22a and 22b. The battery stack 12 is mounted in a first region S1 positioned further forward than the rib 22a with respect to the vehicle 100. The battery stack 11 is mounted in a second region S2 positioned between the rib 22a and the rib 22b. The battery stacks 13 and 14 are mounted in a third region S3 positioned further rearward than the rib 22b with respect to the vehicle 100.

Figure 9:
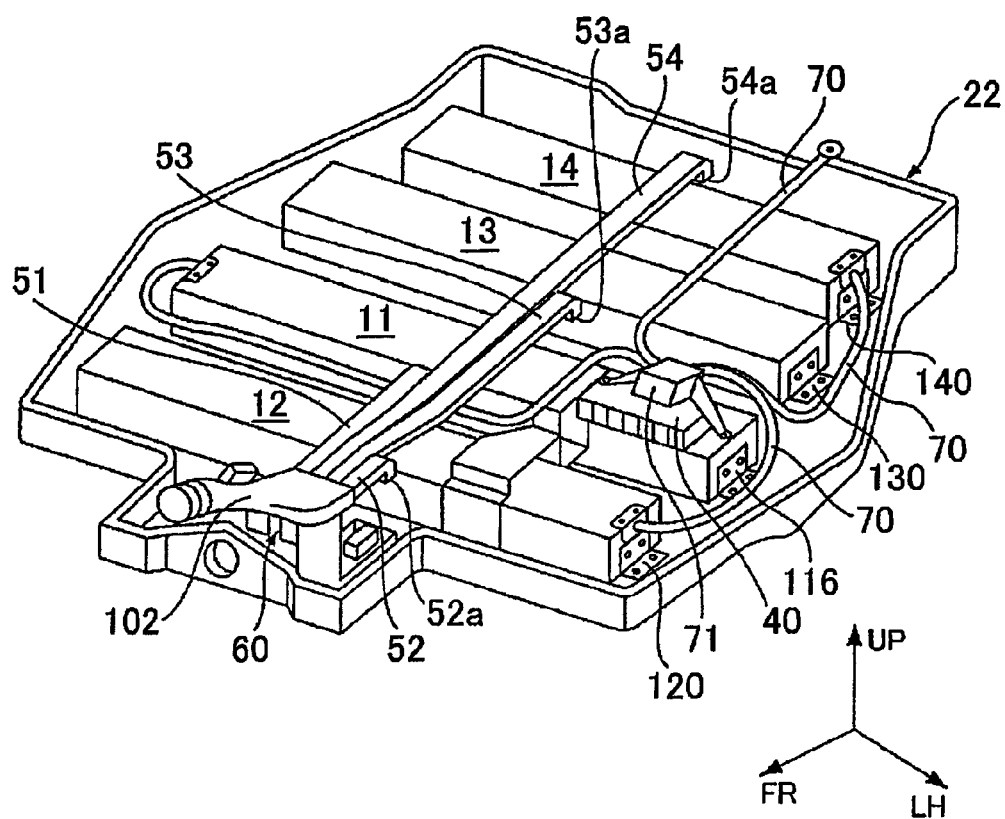
FIG. 9 is an external view for explaining the internal structure of the battery unit.

As shown in FIG. 9, four branch ducts 51 to 54 are connected to the intake duct 102. FIG. 9 is a diagram showing the arrangement of the branch ducts 51 to 54. The air from the intake duct 102 moves into the four branch ducts 51 to 54.

A connection port of the branch duct 51 is connected to a connection port 114a of the intake chamber 114 provided for the battery stack 11. The branch duct 51 is connected on the front side of the battery stack 11 with respect to the vehicle 100. The air in the branch duct 51 is supplied to the unit cell 111 of the battery stack 11. A connection port 52a of the branch duct 52 is connected to the intake chamber provided for the battery stack 12 and the air in the branch duct 52 is supplied to the unit cell of the battery stack 12. The branch duct 52 is connected on the front side of the battery stack 12 with respect to the vehicle 100.

A connection port 53a of the branch duct 53 is connected to the intake chamber provided for the battery stack 13 and the air in the branch duct 53 is supplied to the unit cell of the battery stack 13. The branch duct 53 is connected on the front side of the battery stack 13 with respect to the vehicle 100. A connection port 54a of the branch duct 54 is connected to the intake chamber provided for the battery stack 14 and the air in the branch duct 54 is supplied to the unit cell of the battery stack 14. The branch duct 54 is connected on the rear side of the battery stack 14 with respect to the vehicle 100.

As, shown in FIG. 9, electronic equipment 60 is placed under the intake duct 102. The electronic equipment 60 is fixed to the lower case 22. The electronic equipment 60 is used to control charging and discharging of the battery stacks 11 to 15. System main relays and a resistor are examples of the electronic equipment 60. The system main relays allow and inhibit the charging and discharging of the battery stacks 11 to 15. The system main relays and the resistor are attached to a junction box.

Figure 10:
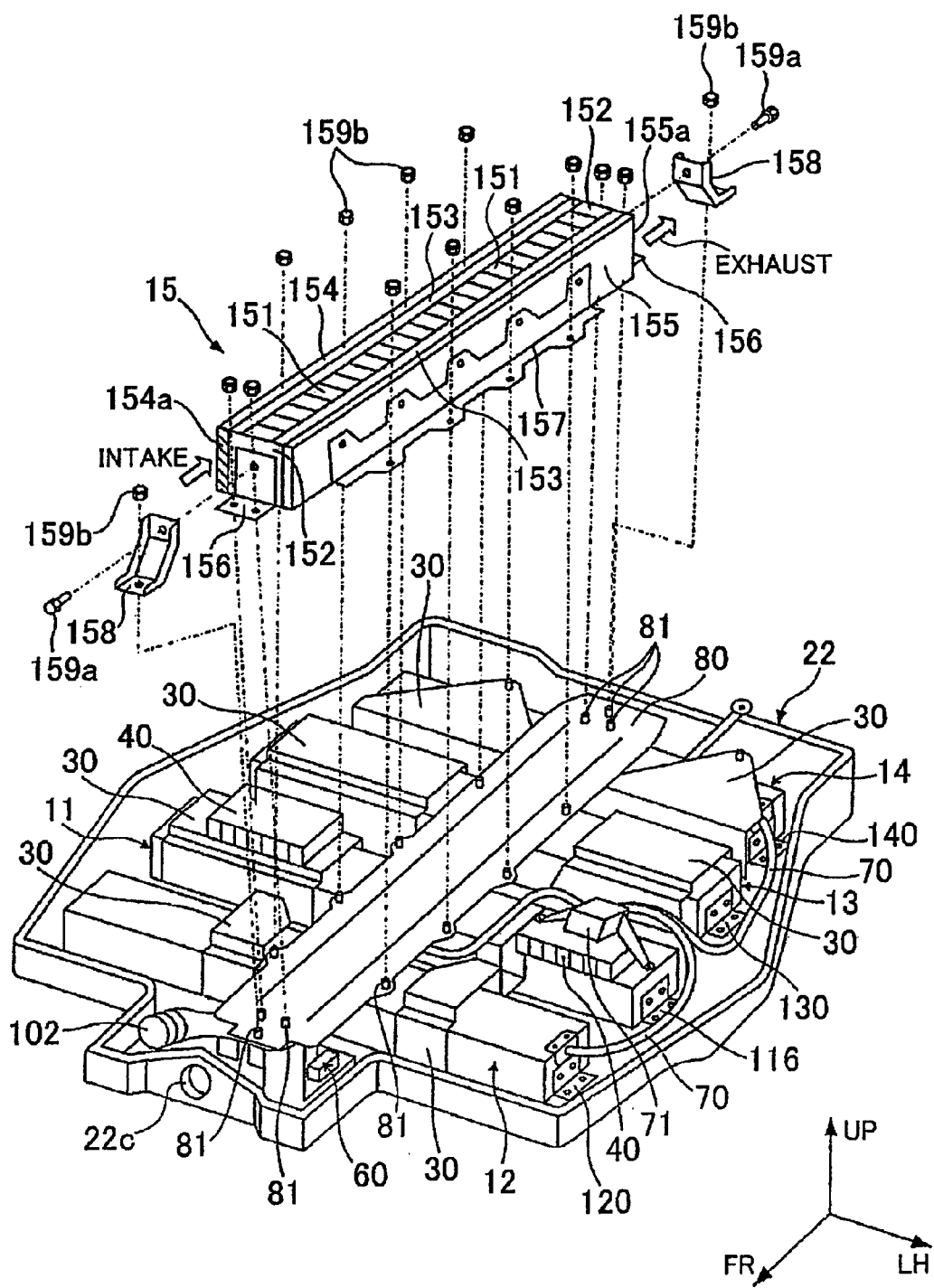
FIG. 10 is an external view of the internal structure of the battery unit.

As shown in FIG. 10, a base 80, serving as part of a supporting member, that is formed of a metal, such as iron, is placed over the branch ducts 51 to 54. The base 80 is also present over part of the intake duct 102. The base 80 and the branch ducts 51 to, 54 overlap each other when viewed from above. The base 80 is fixed to the lower case 22 via a bracket (not shown). With this leg, it is possible to position the base 80 over the branch ducts 51 to 54.

The structure for fixing the base 80 to the lower case 22 may be suitably selected. Specifically, it suffices that the base 80 is fixed over the branch ducts 51 to 54. Although the base 80 and the bracket are separate from each other in this embodiment, the base 80 and the bracket may be an integral member.

A plurality of stud bolts 81 are provided on the upper side of the base 80. The battery stack 15 is placed on the upper side of the base 80. The battery stack 15 has a plurality of unit cells 151, which are aligned in one direction (longitudinal direction of the vehicle 100).

A pair of end plates 152 are placed at two ends of the battery stack 15. A restraining band 153 extends in the longitudinal direction of the vehicle 100 and two end portions of the restraining band 153 are fixed to the pair of end plates 152. Two of the restraining bands 153 are placed on the upper side of the battery stack 15 and two of the restraining bands 153 are placed on the lower side of the battery stack 15. With the use of the restraining bands 153 and the end plates 152, a restraining force is exerted on the plurality of unit cells 151.

Two brackets 156 and 158 are fixed to the end plates 152 via bolts 159a. The stud bolts 81 of the base 80 are passed through the brackets 156 and 158 and engage with the nuts 159b.

An intake chamber 154 and an exhaust chamber 155 are disposed at two sides of the battery stack 15. The intake chamber 154 extends in the direction of alignment of the plurality of unit cells 151 and one end of the intake chamber 154 is provided with a connection port 154a. The other end of the intake chamber 154 is closed. The exhaust chamber 155 extends in the direction of alignment of the plurality of unit cells 151 and one end of the exhaust chamber 155 is provided with an exhaust port 155a. The other end of the exhaust chamber 155 is closed. The connection port 154a is provided at one end of the battery stack 15 in the longitudinal direction of the vehicle 100 and the exhaust port 155a is provided at the other end of the battery stack 15 in the longitudinal direction of the vehicle 100. The connection port 154a is connected to the intake duct 102 and the air from the intake duct 102 enters the intake chamber 154.

Figure 11:
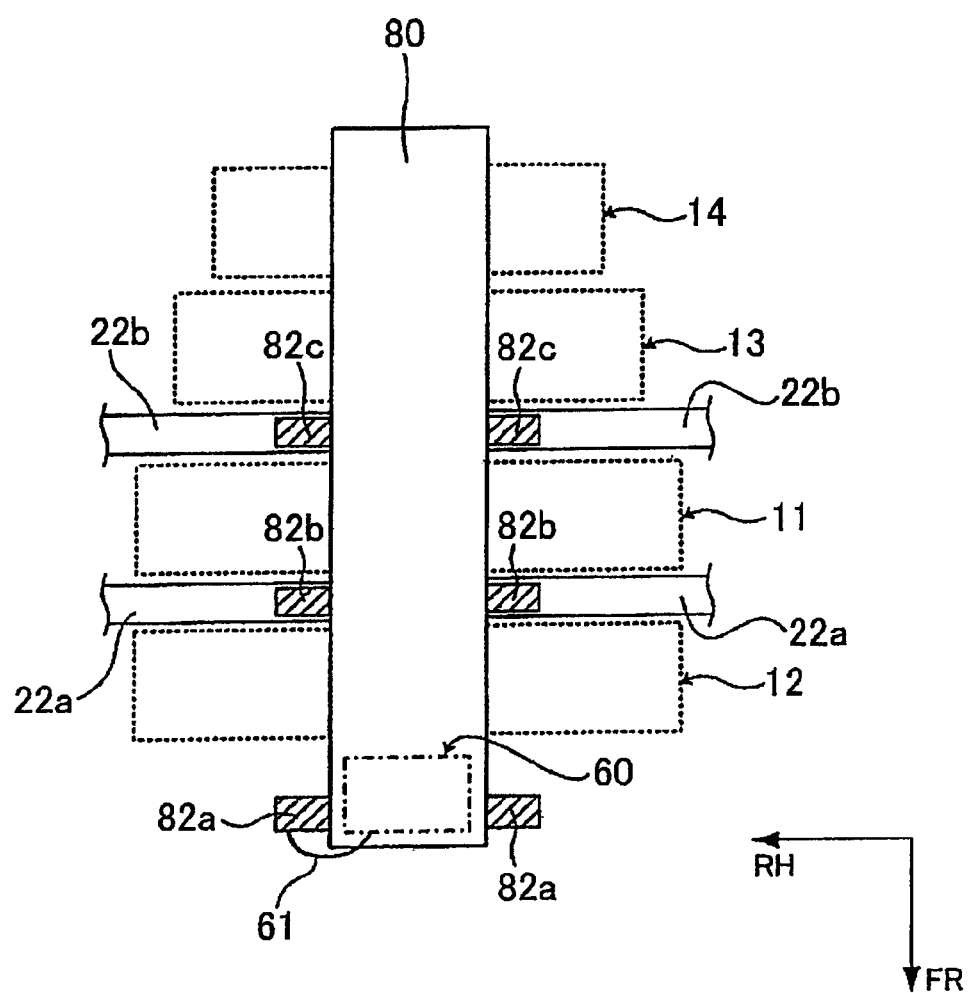
FIG. 11 is a plan view showing a structure for fixing a base.

Meanwhile, as shown in FIG. 11, the base 80 is fixed to the lower case 22 via a plurality of brackets 82a to 82c, which serve as part of the supporting member. The brackets 82a to 82c are formed of a metal, such as iron. The brackets 82a are in contact with the lower carrier 221 of the lower case 22 and a shielded wire 61 (shielded wire of a wire harness 70) included in the electronic equipment 60 is connected to one of the two brackets 82a.

The wire harness 70 is used to charge and discharge the battery stacks 11 to 15 and includes the shielded wire 61 for blocking noise. The shielded wire 61 and the bracket 82a are fixed to the lower case 22 via the same fastening member. The brackets 82b are fixed to the rib 22a of the lower case 22 (see FIG. 8) and the brackets 82c are fixed to the rib 22b of the lower case 22 (see FIG. 8).

The brackets 82b penetrate the lower carrier 221 of the lower case 22 and are in contact with the reinforcement 222a of the frame 222 (see FIG. 5). The brackets 82c penetrate the lower carrier 221 of the lower case 22 and are in contact with the reinforcement 222b of the frame 222 (see FIG. 5).

A bracket 157 extends in the direction of alignment of the plurality of unit cells 151 and is fixed to the battery stack 15 on the LH side. The stud bolts 81 of the base 80 are passed through the bracket 157 and engage with the nuts 159b. Although not shown in FIG. 10, a bracket 157 is also fixed to the battery stack 15 on the RH side. The battery stack 15 is fixed to the base 80 with the use of three types of brackets 156 to 158. The bus bar module is placed on the upper side of the battery stack 15 as described with reference to FIG. 6.

The battery stacks 12 to 14 are pressed against the lower case 22 by the brackets 30. The shapes of the brackets 30 for the battery stacks 12 to 14 differ from each other. The five battery stacks 11 to 15 are electrically connected via the wire harness 70. An opening 22c is formed in a side wall of the lower case 22 to pass the cable for connecting between the battery stacks 11 to 15 and the load through the opening 22c.

A circuit breaker 71 is fixed to one of two battery monitoring units 40. The circuit breaker 71 is used to break the line of the battery stacks 11 to 15. The circuit breaker 71 includes a plug and a socket, into which the plug is inserted, and it is possible to break the line by removing the plug from the socket.

The circuit breaker 71 is passed through the opening 20c (see FIG. 2) of the pack case 20 and is passed through the opening formed in the floor panel 101. Thus, the circuit breaker 71 protrudes into the cabin and an operator can operate the circuit breaker 71 in the cabin. The circuit breaker 71 may be positioned in the space created under a seat cushion. In addition, a seal member may be used to secure the hermeticity between the opening 20c of the pack case 20 and the floor panel 101.

Figure 12:
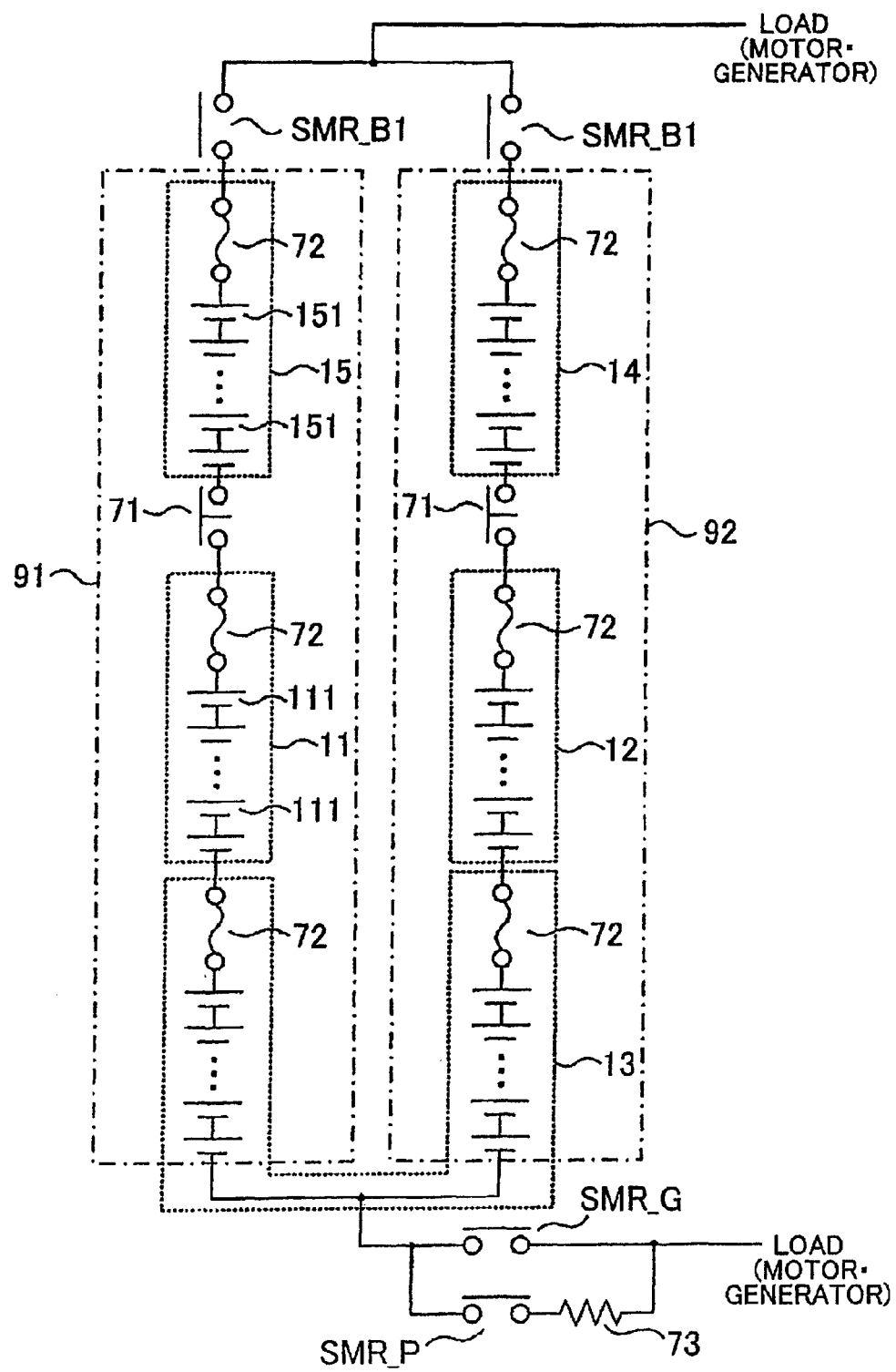
FIG. 12 is a diagram showing a circuit configuration of the battery unit.

Next, the circuit configuration of the battery unit 1 will be described with reference to FIG. 12.

In this embodiment, two battery packs 91 and 92 are formed by the five battery stacks 11 to 15 and are electrically connected in parallel. The number of unit cells constituting the battery pack 91 and the number of unit cells constituting the battery pack 92 are equal to each other. The battery packs 91 and 92 are connected to the load. Examples of the load include a motor generator, a step-up circuit, and an inverter.

One of the two battery monitoring units 40 shown in FIG. 10 is used to monitor the state of the battery pack 91 and the other battery monitoring unit 40 is used to monitor the state of the battery pack 92. The parameters of the state of the battery packs 91 and 92 include electric currents, voltages, and temperatures. The voltages include the voltage of each of the battery packs 91 and 92, the voltage of each unit cell, the voltages of a plurality of blocks, into which the plurality of unit cells constituting the battery packs 91 and 92 are divided. Each block includes two or more unit cells. The temperatures include those obtained by measuring one or more points of each of the battery packs 91 and 92.

The electric currents, the voltages, and the temperatures monitored by the battery monitoring units 40 are used to control the charging and discharging of the battery stacks 11 to 15. The electric currents, for example, are used to estimate the state of charge (SOC) of the battery stacks 11 to 15 and to estimate the deterioration conditions of the battery stacks 11 to 15. The voltages, for example, are used to prevent the overcharge and the overdischarge of the battery stacks 11 to 15.

The battery pack 91 is constituted of the two battery stacks 11 and 15 and part of the battery stack 13, in which the unit cells of the battery stacks 11, 15, and 13 are electrically connected in series. The battery pack 92 is constituted of the two battery stacks 12 and 14 and part of the battery stack 13, in which the unit cells of the battery stacks 12, 14, and 13 are electrically connected in series.

Each of the battery stacks 11 to 15 has a fuse 72. The circuit breaker 71 is provided between the battery stacks 11 and 15 and the circuit breaker 71 is also provided between the battery stacks 12 and 14. The two circuit breakers 71 are integrated into one unit, so that it is possible to simultaneously break the lines of both of the battery packs 91 and 92 by removing the plug of the circuit breaker 71.

A system main relay SMR_B1 is connected to a positive terminal of the battery pack 91 and a system main relay SMR_B2 is connected to a positive terminal of the battery pack 92. A system main relay SMR_G is connected to negative terminals of the battery packs 91 and 92. A system main relay SMR_P and a resistor 73 are connected in parallel with the system main relay SMR_G. The system main relays SMR_B1, B2, G, and P are included in the electronic equipment 60.

In order to electrically connect the battery packs 91 and 92 and the load, first, the system main relays SMR_B1 and B2, and the system main relay SMR_P are switched from off to on. Next, after switching the system main relay SMR_G from off to on, the system main relay SMR_P is switched from on to off. In this way, it is possible to charge and discharge the battery packs 91 and 92. By connecting the battery packs 91 and 92 to a DC power source or an AC power source, it is made possible to charge the battery packs 91 and 92.

Figure 14:
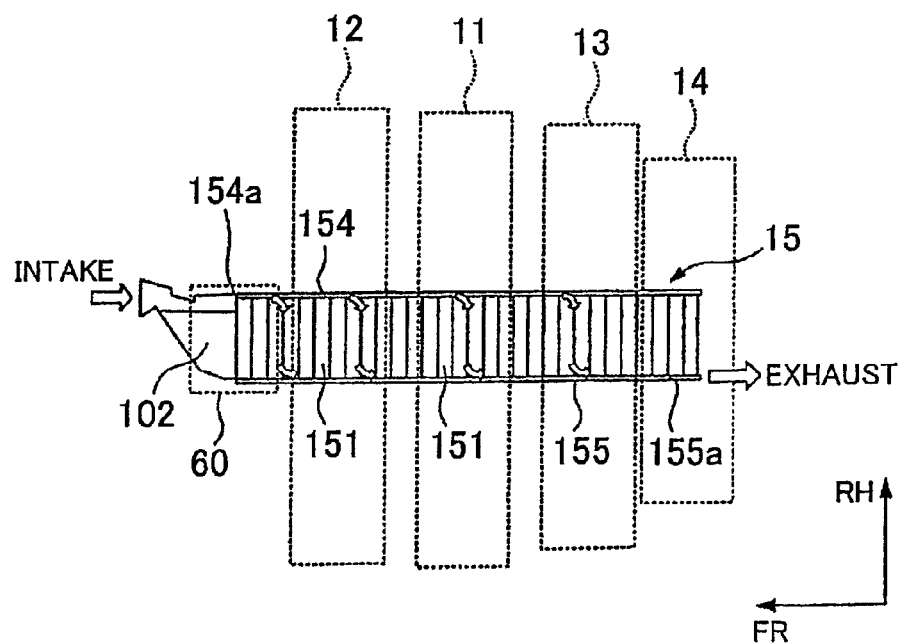
FIG. 14 is a diagram for explaining the flow path of the air in the battery stack.
Figure 15:
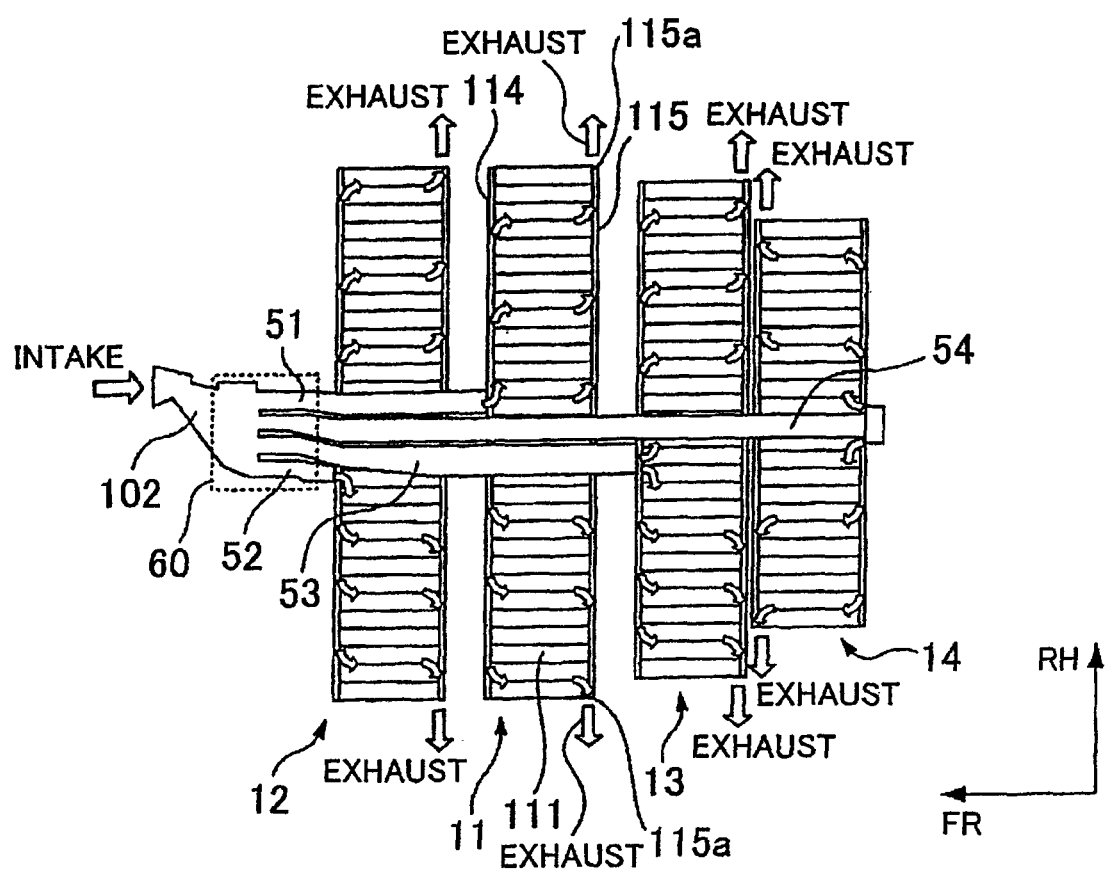
FIG. 15 is a diagram for explaining the flow path of the air in the battery stack.

Next, the flow of air that is supplied to the battery unit 1 will be described with reference to FIGS. 13 to 15.

Figure 13:
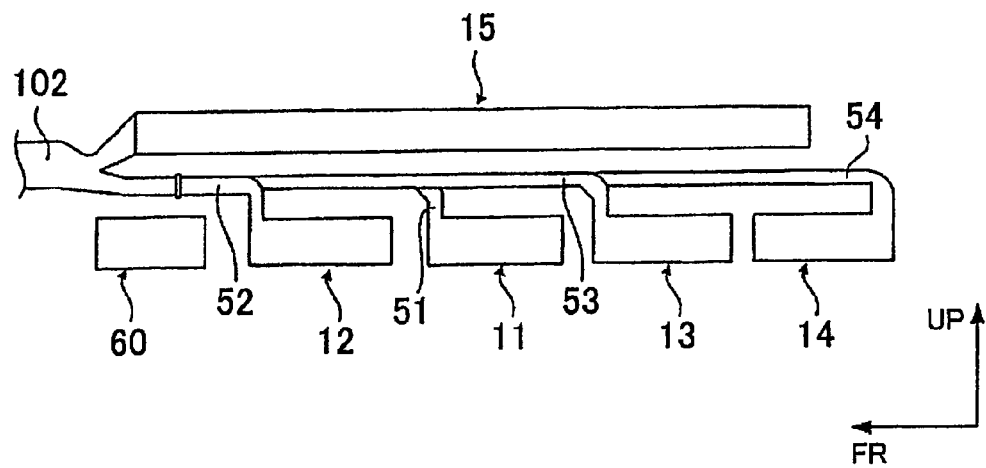
FIG. 13 is a side view showing the internal structure of the battery unit.

As shown in FIG. 13, the air from the intake duct 102 is introduced into the battery stack 15 and is introduced into the battery stacks 11 to 14 through the branch ducts 51 to 54. When air moves into the battery stack 15, as shown by the arrows in FIG. 14, the air moves along the intake chamber 154 and enters the space created between two adjacent unit cells 151. Heat is exchanged between the air and the unit cells 151, so that the temperature of the unit cells 151 is regulated.

The air introduced into the battery stack 15 moves from the Intake chamber 154 toward the exhaust chamber 155. The air after heat exchange moves into the exhaust chamber 155 and is discharged through the exhaust port 155a of the exhaust chamber 155. The air discharged through the exhaust port 155a moves into the space (the space in which the battery stacks 11 to 15 are accommodated) surrounded by the upper case 21 and the lower case 22.

The air that passes through the branch duct 51 is introduced into the battery stack 11. The air introduced into the battery stack 11 moves along the intake chamber 114. The air moves toward the two ends of the battery stack 11. The air moves along the direction of alignment of the battery stack 11 and enters the space created between two adjacent unit cells 111. Heat is exchanged between air and the unit cells 111, so that the temperature of the unit cells 111 is regulated. The air after heat exchange moves into the exhaust chamber 115 and is discharged through the exhaust ports 115a that are provided at the two ends of the battery stack 11. The air discharged through the exhaust ports 115a moves into the space surrounded by the upper case 21 and the lower case 22.

The air introduced from the branch duct 52 into the battery stack 12 moves toward the two ends of the battery stack 12 in the intake chamber and moves into the space created between two adjacent unit cells. The air after the heat exchange with the unit cells moves into the exhaust chamber and is discharged through the exhaust ports provided at the two ends of the battery stack 12. The air discharged through the exhaust ports of the battery stack 12 moves into the space surrounded by the upper case 21 and the lower case 22.

The air introduced from the branch duct 53 into the battery stack 13 moves toward the two ends of the battery stack 13 in the intake chamber and moves into the space created between two adjacent unit cells. The air after the heat exchange with the unit cells moves into the exhaust chamber and is discharged through the exhaust ports provided at the two ends of the battery stack 13. The air discharged through the exhaust ports of the battery stack 13 moves into the space surrounded by the upper case 21 and the lower case 22.

The air introduced from the branch duct 54 into the battery stack 14 moves toward the two ends of the battery stack 14 in the intake chamber and moves into the space created between two adjacent unit cells. The air after the heat exchange with the unit cells moves into the exhaust chamber and is discharged through the exhaust ports provided at the two ends of the battery stack 14. The air discharged through the exhaust ports of the battery stack 14 moves into the space surrounded by the upper case 21 and the lower case 22. The exhaust chamber of the battery stack 13 and the exhaust chamber of the battery stack 14 face each other in the longitudinal direction of the vehicle 100.

The air in the pack case 20 (air after heat exchange) is introduced into the exhaust duct 106 and moves to the outside of the pack case 20. The air that enters the exhaust duct 106 moves along the exhaust duct 106 and is discharged into the outside of the vehicle 100 through the exhaust port 106b (see FIG. 1).

As described with reference to FIG. 11, according to this embodiment, it is possible to ground the shielded wire 61 via the brackets 82a, the base 80, and the brackets 82b and 82c. Although it is also possible to extend the shielded wire 61 to the reinforcements 222a and 222b, wiring of the shielded wire 61 becomes complex in this case. In this embodiment, the gounding path of the shielded wire 61 is formed via the brackets 82a to 82c and the base 80, so that it is possible to make the shielded wire 61 short.

The base 80 tends to be heated because the base 80 is placed between the battery stack 15 and the battery stacks 11 to 14. The space, in which the base 80 is placed, is sandwiched between the battery stack 15 and the battery stacks 11 to 14 and therefore, there is a tendency that heat remains in this space. For example, there is a case where heat generated by the battery stacks 11 to 14 rises and reaches the base 80 and heat remains in the base 80. Moreover, because the electronic equipment 60 is placed under the base 80, the heat generated by the electronic equipment 60 can rise and reach the base 80. If the heat continues to remain in the base 80, there is a fear that the battery stacks 11 to 15 are adversely affected by the heat of the base 80.

In this embodiment, the base 80 is connected to the frame 222 (reinforcements 222a and 222b) of the lower case 22 via the brackets 82b and 82c, so that the heat of the base 80 is dissipated to the frame 222. The heat transferred to the frame 222 is dissipated to the atmosphere. In this way, it is possible to prevent heat from remaining in the base 80. In this embodiment, the base 80, the brackets 82b and 82c, and the frame 222 form the heat dissipation path, so that it is possible to release the heat in the pack case 20 to the outside of the pack case 20.

As shown in FIG. 11, the brackets 82b and 82c are placed in a central region in the longitudinal direction (FR direction) of the base 80 and are placed in a central region in the longitudinal direction (RH direction) of the battery stacks 11 to 13. The region, in which the brackets are placed, corresponds to the center of the space in the pack case 20 and is therefore the region, from which it is the most difficult for heat to escape. The brackets 82b and 82c are placed in such regions, so that it is possible to efficiently dissipate the heat in the pack case 20 to the outside of the pack case 20 via the brackets 82b and 82c.

In addition, although the battery monitoring units 40 are disposed over the battery stack 11 as shown in FIG. 10, it is possible to dissipate the heat around the battery monitoring units 40 to the outside of the pack case 20 via the brackets 82b and 82c because the brackets 82b and 82c are disposed at positions that sandwich the battery stack 11. In this way, it is possible to suppress the increase in temperature of the battery monitoring units 40.

Although the base 80 is fixed to the lower case 22 via the brackets 82a to 82c in this embodiment, the invention is not limited to this. The base 80 may be fixed to the upper case 21, for example. In this case, it is required to provide the upper case 21 with a member corresponding to the frame 222.

Meanwhile, by placing the battery stack 15 in the center tunnel 101a as in this embodiment, it is made possible to use a larger number of battery stacks 11 to 15 to form the battery unit 1. Since the center tunnel 101a is positioned between the driver's seat and the passenger seat, no adverse effect is caused in terms of the comfort in the cabin even when the center tunnel 101a is provided.

In addition, it is possible to arrange the battery unit 1 along the floor panel 101 by placing the battery stack 15 in the center tunnel 101a and placing the electronic equipment 60 and the battery stacks 11 to 14 in one plane. In other words, the battery unit 1 is efficiently disposed along the outer surface of the vehicle 100 and it is made possible to suppress the increase in size of the battery unit 1 in the vertical direction of the vehicle 100.

Although one battery stack 15 is placed in the center tunnel 101a of the floor panel 101 in this embodiment, the invention is not limited to this. For example, a plurality of battery stacks may be placed in the center tunnel 101a. The plurality of battery stacks placed in the center tunnel 101a may be aligned either in the longitudinal direction of the vehicle 100 or in the lateral direction of the vehicle 100. It is not necessary that the entire battery stack 15 is placed in the center tunnel 101a. Part of the battery stack 15 may be placed in the center tunnel 101a.

Although, in this embodiment, as described with reference to FIG. 12, two battery packs 91 and 92 are electrically connected in parallel, the invention is not limited to this. For example, the battery packs 91 and 92 may be connected in series. Alternatively, a configuration may be employed, in which three or more battery packs are formed with the use of the battery stacks 11 to 15 and these battery packs are electrically connected in parallel. Meanwhile, although the air present outside the vehicle 100 is supplied to the battery unit 1 in this embodiment, the air in the cabin may be supplied to the battery unit 1. Instead of air, another coolant (gas) may be used.

Although the four battery stacks 11 to 14 are disposed under the battery stack 15 in this embodiment, the invention is not limited to this. Specifically, the number of battery stacks that are disposed under the battery stack 15 may be one or greater. Although the battery stack 15 and the battery stacks 11 to 14 are disposed so as to be perpendicular to each other when viewed from above (see FIG. 14) in this embodiment, the invention is not limited to this. The battery stack 15 and the battery stacks 11 to 14 may be disposed so as to intersect each other. The battery stacks that are disposed under the battery stack 15 may be aligned so as to be oriented in the direction the same as that of the battery stack 15.

In a case where at least two battery stacks are stacked in the vertical direction as described above, the base 80 and the brackets 82b and 82c described in the description of this embodiment may be disposed between two adjacent battery stacks. With this configuration, the upper battery stack is supported by the base 80 and heat dissipation path is formed by the base 80 etc.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. An electricity storage device comprising:
a first battery stack including a plurality of cells that are aligned;
a second battery stack, including a plurality of cells that are aligned, that is placed under the first battery stack;
a case that accommodates the first battery stack and the second battery stack; and
a supporting member that is fixed to the case and supports the first battery stack, the supporting member being placed between the first battery stack and the second battery stack, wherein
the case includes an inner wall formed of electrically insulating material and a reinforcement frame that is exposed to an outside of the case and is formed of metal, and
the supporting member is formed of metal, penetrates the inner wall, and is in contact with the reinforcement frame.

2. The electricity storage device according to claim 1, further comprising a wire harness, including a shielded wire, that is used to charge and discharge the first battery stack and the second battery stack,
wherein the shielded wire is connected to the supporting member at a portion different from a portion, at which the supporting member is in contact with the reinforcement frame.

3. The electricity storage device according to claim 1, wherein
a plurality of the second battery stacks are aligned along the first battery stack, and
the reinforcement frame is positioned between adjacent two of the second battery stacks.

4. The electricity storage device according to claim 1, wherein the first battery stack and the second battery stack are arranged so as to be perpendicular to each other when viewed from above the first battery stack and the second battery stack.

5. A vehicle comprising:
the electricity storage device according to claim 1; and
a motor/generator that receives electric power from the electricity storage device to generate kinetic energy for driving the vehicle.

6. An electricity storage device comprising:
a first battery stack including a plurality of cells that are aligned;
a second battery stack, including a plurality of cells that are aligned, that is placed under the first battery stack;
a case that accommodates the first battery stack and the second battery stack;
a supporting member that is formed of metal and that is fixed to the case and supports the first battery stack, the supporting member being placed between the first battery stack and the second battery stack; and
a reinforcement frame that is in direct contact with the supporting member and is exposed to an outside of the case, thereby being configured to release heat in the case to the outside of the pack case.

7. A vehicle comprising:
the electricity storage device according to claim 6; and
a motor/generator that receives electric power from the electricity storage device to generate kinetic energy for driving the vehicle.

* * * * *